Nov. 6, 1945.   C. BRONGERSMA   2,388,382
MOTOR CONTROL
Filed Jan. 2, 1943
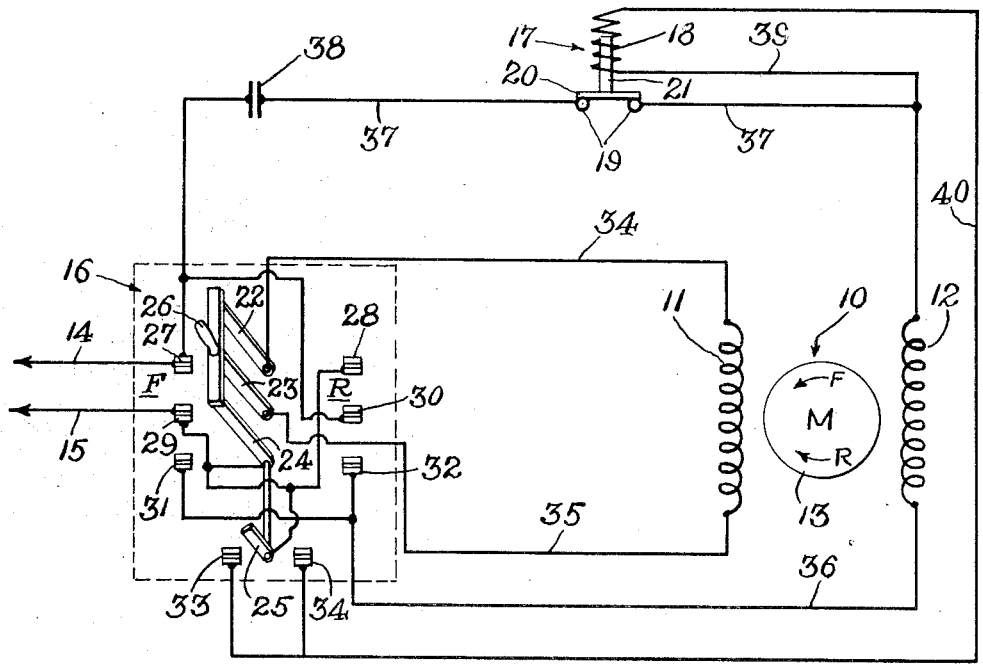
Inventor
Cornelius Brongersma
BY
Parker, Carton, Pigmen & Hubbard.
Attorneys.

Patented Nov. 6, 1945

2,388,382

UNITED STATES PATENT OFFICE 2,388,382

MOTOR CONTROL

Cornelius Brongersma, Muskegon Heights, Mich., assignor to Manning, Maxwell & Moore, Inc., Muskegon, Mich., a corporation of New Jersey Application January 2, 1943, Serial No. 471,127

6 Claims. (Cl. 172—279)

My invention relates to improvements in control arrangements for alternating current single phase motors, and more particularly, to such an arrangement which is characterized by the extremely speedy and reliable character of reversibility for such a single phase motor.

Single phase alternating current motors are commonly equipped with some form of starting winding to provide a field which is out of phase with that of the main winding during the starting period. In fractional horsepower, and larger sizes, of such motors, it is desirable to cut the starting winding out of circuit after the motor comes up to speed, and a variety of devices for that purpose have heretofore been employed in the art. One device which may be employed for the latter purpose is a potential relay. In such case the relay's actuating winding may be connected in shunt with the motor's starting winding, and the latter may be energized through the normally closed contacts of the relay. Consequently, as the motor comes up to speed the voltage across the starting winding, and hence across the potential relay, rises until such relay opens, thereby cutting out the starting winding. Such an arrangement, employing a potential relay for cutting out the starting winding after the motor comes up to speed, is advantageous as compared to other arrangements which have heretofore been employed, such as centrifugally operated switches; in that it is mechanically simple and reliable in operation. However, a potential relay arrangement has the drawback that it is entirely unsuited for use in instances where quick reversal is required. An electric hoist is a prime example of such an instance. Although arrangements have heretofore been provided for affording such positive and quick reversal when using centrifugal or other speed-responsive switches, such, for example, as that shown in Whitcomb Patent No. 2,274,175, issued February 24, 1942, it has not, prior to my invention, been possible successfully to employ the basically simpler potential relay type of control where quick and positive reversibility are required.

The inherent difficulty in attempting to use a potential relay, as so far described, in an installation where quick and positive reversibility are required, is that when the reversing switch is moved rapidly from one "on" position to the other, that is, from "forward" to "reverse" or vice versa, the reclosure of the potential relay is retarded because of the relatively slow rate at which the voltage in the starting winding of the motor dies down. In other words, during normal running operation of the motor, a voltage is induced in the open-circuited starting winding and is applied to the shunt-connected actuating winding of the potential relay, thus retaining the relay energized and open. When the main winding of the motor is open-circuited, upon throwing the reversing switch, the induced voltage in the starting winding dies down fairly slowly and therefore the potential relay cannot reclose until such an induced voltage has fallen to a very low value. On the other hand, the motor cannot be reversed until the relay has reclosed to cut the starting winding back into circuit, for it is an inherent peculiarity of the motors in question that they can be reversed only with the starting winding in circuit. In other words, reversal of the potential on the main winding alone will merely cause the motor to persist in rotation in the initial direction.

The general aim of the present invention is to overcome the difficulties outlined above, and more specifically, to provide a novel form of control for a single phase alternating current motor, which employs a simple potential relay for cutting a starting winding out of circuit, but which is nevertheless capable of affording quick and positive reversal of the motor when desired.

More particularly stated, it is an object of the present invention to provide an apparatus of the type indicated employing a simple potential relay for cutting the starting winding out of circuit when the motor comes up to speed, plus an associated control device coacting with the main reversing switch in such manner that the actuating winding of the potential relay is positively open-circuited upon throwing of the reversing switch from one "on" position to the other so that the potential on the relay will be killed and the relay caused to reclose instantly whenever such reversing switch is thrown.

Further objects and advantages of the invention will become apparent as the following description proceeds, taken in connection with the accompanying drawing in which:

The single figure is a schematic wiring diagram of a single phase alternating current motor and controls therefor embodying the present invention.

Referring more particularly to the illustrative embodiment of the invention shown in the drawing, as there indicated I employ a single phase alternating current motor designated generally by the numeral 10 and comprising main winding 11 and an auxiliary or starting winding 12, as well as a rotor 13 which may be of the conventional squirrel cage type. This motor is supplied with current from suitable alternating current supply lines 14, 15 under the control of a main reversing switch, designated generally as 16, and a potential relay 17.

The potential relay 17 comprises the usual actuating winding 18 and a pair of stationary contacts 19 bridged by a movable contact 20 carried on an armature 21. The contacts 19 are normally closed by the bridging contact 20 biased to closed position and pulled to open position upon energization of the actuating winding 18.

The main reversing switch 16 may take a variety of forms insofar as actual structure is concerned and has been illustrated herein, by way of a simple exemplification, as being of the manually operated knife blade type. Thus, as shown, it comprises a set of four swinging contact blades 22, 23, 24 and 25, all schematically interconnected to be swung in unison by a handle 26, but insulated electrically from each other. Coacting with the switch blades 22 to 25 are respective pairs of stationary contacts 27—28, 29—30, 31—32 and 33—34, respectively.

The supply lines 14, 15 are connected to the switch contacts 27 and 29, respectively, and also through reverse connections to the contacts 30 and 28, respectively. The coacting switch blades 22 and 23 for these contacts are connected to the respective terminals of the motor's main winding 11 through conductors 34 and 35. It will thus be seen that when the blades 22, 23 are closed alternately against the respective contacts 27, 29 and 28, 30, the main winding of the motor is energized with respectively reversed instantaneous polarity. In other words, the connections so far detailed comprise simply an ordinary reversing switch control for the motor's main winding 11.

One terminal of the other or starting winding 12 of the motor is connected by a conductor 36 with both the switch terminals 31 and 32 so that in either "on" position of the switch 16 such terminal of the starting winding 12 will be connected to the supply line 15 through the conductor 36, one or the other of the contacts 31—32, and the coacting switch blade 24 which is connected to the line 15. The other terminal of the starting winding 12 is connected to the other supply line 14 through a conductor 37 having interposed therein the contacts 19 of the potential relay 17 and a capacitor 38. The latter effects the phase displacement of the starting winding relative to the main winding necessary for starting of the motor.

Turning now to the most critical connection of the circuit, it will be observed that one terminal of the actuating winding 18 for the potential relay is connected by a conductor 39 to one terminal of the motor's starting winding 12. Instead of connecting the other terminal of the relay's actuating winding 18 to the other terminal of the starting winding, as would be the usual practice to connect them in shunt, such other terminal of the winding 18 is instead connected by a conductor 40 to both of the switch contacts 33, 34, the coacting switch blade 25 being connected to the supply line 15. Consequently, whenever the main reversing switch 16 is in either of its "on" positions, the relay winding 18 is connected in shunt with the motor's starting winding 12, but such shunt connection is interrupted instantly on throwing the main switch 16.

By way of summary of the operation of the system described, it will first of all be observed that when the main switch 16 is positioned with its movable blades in their intermediate or "off" position illustrated, that both windings 11 and 12 of the motor are open-circuited and it will remain at rest. The left and right-hand positions of the main switch 16 have been arbitrarily marked in the drawing as "F" and "R" to indicate what may be termed the "forward" and "reverse" positions of the same, corresponding to the directions of rotation similarly indicated by the arrows marked "F" and "R" on the rotor 13. Upon closing the switch 16 in its "forward" position, the motor's main winding 11 is connected to the supply lines 14, 15 (through conductors 34, 35 and switch contacts 27, 29) while the motor's starting winding 12 is also connected across the supply lines, but in series with the capacitor 38, relay contacts 19, 20 being closed. The resulting out-of-phase energization of the two motor windings causes a rotating field to be set up which starts the armature 13 revolving in a "forward" direction. As the motor comes up to speed the voltage across the starting winding 12 increases, and therefore correspondingly increases across the shunt-connected actuating winding 18 of the potential relay. Finally, the voltage across this relay winding becomes sufficiently great that the relay contacts 19, 20 are opened, thereby open-circuiting the starting winding 12 and the capacitor 38. However, the induced voltage in the starting winding 12 remains sufficiently great during normal operation that the potential relay 17 is retained energized and open throughout the normal running of the motor.

To reverse the motor when it is running in a "forward" direction, as described above, the operator has only to throw the switch 16 from the "forward" to the "reverse" position. In so throwing the main switch 16, the circuit of the relay winding 18 is interrupted the instant the blade 25 leaves the cooperating stationary switch contact 33 so that the relay instantly recloses. It is to be observed that such removal of the voltage on the relay winding 18 takes place upon throwing the reversing switch, due to opening of the switch contacts by the blade 25, irrespective of any persistence of potential in the starting winding 12. Consequently, reclosure of the relay 17 is assured by the time the main switch 16 has been moved over into its "reverse" position. Upon closure of the switch 16 in its "reverse" position, the main motor's winding 11 is energized with voltage having an instantaneous polarity reversed with respect to what it was when connected for "forward" rotation, and at the same time the starting winding is connected in circuit through the relay contacts 19, 20 and the capacitor 38. As a consequence, a rotating magnetic field is applied to the rotor, revolving in a direction opposite to that for the previously described forward rotation, and which causes the rotor to turn in its reverse direction. When the rotor comes up to speed, the induced voltage in the starting winding 12 causes a sufficient rise in potential across the relay actuating winding 18 to open the relay's contacts 19, 20. As a consequence, the starting winding 12 is open-circuited and retained open just as in the case of forward rotation for the motor.

In order to stop the motor, when it is rotating in either a "forward" or "reverse" direction, it is necessary merely to throw the main switch 16 to its intermediate or "off" position, whereupon both the motor windings 11 and 12 are open-circuited and the motor thus stopped.

I claim as my invention:

1. The combination with an alternating current single phase motor having a main winding and a starting winding, of a potential relay having an actuating coil connected in parallel with the starting winding and a switch in the circuit connected to the starting winding, said switch being biased to closed position, a reversing switch by which said main winding may be energized with reversing instantaneous polarity, and an auxiliary switch operatively associated with said reversing switch for opening the circuit to said relay coil whereby to close the circuit to the starting winding preparatory to the reversal of the motor.

2. In a control for effecting high speed reversal of a single phase alternating current motor having a main winding and a starting winding, the combination with means including a reversing switch having two alternatively available "on" positions for applying to at least one of said windings an alternating current potential of respectively reversed instantaneous polarity in said two "on" positions, and a potential relay having an actuating winding connected in shunt with said starting winding and a pair of contacts in series with such starting winding, said contacts being biased to close when the relay winding is deenergized, of switch means operative as an incident to operation of said reversing switch for open-circuiting said relay winding whenever the reversing switch is shifted away from one of its "on" positions.

3. In a control for effecting high speed reversal of a single phase alternating current motor having a main winding and a starting winding as well as a phase shifting capacitor in series with the starting winding, the combination of means including a reversing switch having an "off" position and two alternatively available "on" positions for connecting said windings in parallel with each other and to a source of alternating current potential with said capacitor in series with the starting winding and with relatively reversed instantaneous polarity applied to at least one of said windings in respective ones of said "on" positions of the reversing switch, a potential relay having a pair of contacts biased to closed position interposed between said starting winding and capacitor, said relay having an actuating winding, and means including auxiliary contacts on said reversing switch for connecting said relay winding in shunt with said starting winding when said reversing switch is in either of its "on" positions and for open circuiting said relay winding when said reversing switch is in its "off" position.

4. In a control for effecting high speed reversal of a single phase alternating current motor having a main winding and a starting winding, the combination of reversing means for controlling the connection of said windings to a source of alternating current potential and for reversing one of said windings with respect to the other, means including a potential relay having an actuating winding shunted across said starting winding for open circuiting the latter upon energization of such relay, and means operative as an incident to the disconnection of the motor windings from the source of supply by said reversing means and substantially coincidentally with such disconnection for interrupting the shunt connection of said relay winding across said starting winding to effect substantially instant reclosure of the relay.

5. In a control for effecting high speed reversal of a single phase alternating current motor having at least two separate windings, the combination of means for effecting a phase displacement between the currents flowing in said windings upon their excitation from a single source of alternating current potential, reversing means controlling the connection of said windings to a source of alternating current potential to effect selectively rotation of said motor in respective opposite directions and to disconnect said windings from said source, means including a potential relay having an actuating winding and a pair of contacts biased to closed position for disabling said phase shifting means by opening of said contacts, and means operative as an incident to the disconnection of said windings from the source of supply by said reversing means for open circuiting said relay winding and for shunting said relay winding across a motor winding whenever the motor windings are connected to the source of said reversing means.

6. In a control for effecting high speed reversal of a single phase alternating current motor having at least two separate windings, the combination of means including a capacitor for effecting a displacement in phase between the currents flowing in said windings upon their parallel excitation from a single source of alternating current potential, means including a reversing switch having alternatively available "on" positions and an "off" position for connecting said windings in parallel to a source of alternating current potential for respective opposite directions of motor rotation in the "on" positions of said switch and for disconnecting the same from such source in its "off" position, means including a potential relay having an actuating winding and a pair of contacts biased to closed position for open circuiting said capacitor by opening of said contacts, and means operative as an incident to actuation of said reversing switch for open circuiting said relay winding whenever the reversing switch is in its "off" position and for shunting said relay winding across a motor winding when the reversing switch is in one of its "on" positions.

CORNELIUS BRONGERSMA.